US010061320B2

(12) United States Patent
Tavares et al.

(10) Patent No.: US 10,061,320 B2
(45) Date of Patent: Aug. 28, 2018

(54) REMOTELY OPERATED VEHICLE CAMERA APPARATUS

(71) Applicant: Aquabotix Technology Corporation, Fall River, MA (US)

(72) Inventors: Durval M. Tavares, Fall River, MA (US); Michael Aprea, Plymouth, MA (US); Joshua Michael Normandin, Swansea, MA (US)

(73) Assignee: Aquabotix Technology Corporation, Fall River, MA (US)

( * ) Notice: Subject to any disclaimer, the term of this patent is extended or adjusted under 35 U.S.C. 154(b) by 0 days.

(21) Appl. No.: 15/814,096

(22) Filed: Nov. 15, 2017

(65) Prior Publication Data

US 2018/0203449 A1 Jul. 19, 2018

Related U.S. Application Data

(60) Provisional application No. 62/447,666, filed on Jan. 18, 2017.

(51) Int. Cl.
*G05D 1/00* (2006.01)
*B63G 8/00* (2006.01)
(Continued)

(52) U.S. Cl.
CPC ........... *G05D 1/0094* (2013.01); *B63G 8/001* (2013.01); *B64C 39/024* (2013.01); *B64D 47/08* (2013.01); *H04N 5/232* (2013.01); *B63G 2008/005* (2013.01); *B64C 2201/108* (2013.01); *B64C 2201/127* (2013.01); *B64C 2201/146* (2013.01)

(58) Field of Classification Search
CPC .................................................. G05D 1/0094
See application file for complete search history.

(56) References Cited

U.S. PATENT DOCUMENTS 3,141,397 A  7/1964  McNeil
5,947,051 A  9/1999  Geiger
(Continued)

FOREIGN PATENT DOCUMENTS

JP  2004120518 A  *  4/2004  ............. H04N 5/222

OTHER PUBLICATIONS

JP 2004120518A; Hirakawa Akinobu; On-Vehicle Camera Platform Device; Fuji Photo Optical Co Ltd; Apr. 2004; English Abstract.*

*Primary Examiner* — Cynthia Segura
(74) *Attorney, Agent, or Firm* — K&L Gates LLP

(57) ABSTRACT

A remotely operated vehicle ("ROV") camera apparatus is disclosed. An ROV includes an anchor housing connected to a body of the ROV. The anchor housing includes a first magnet. The ROV also includes a camera connection housing configured to be rotatably connected to the anchor housing. The camera connection housing includes a connector cup configured to contact the anchor housing, a second magnet located inside the connector cup, the second magnet configured to magnetically couple to the first magnet, and a motor assembly including a motor configured to rotate a drive shaft, the drive shaft being connected to the magnet plate. The ROV further includes a camera device mechanically coupled to the camera connection housing. Actuation of the motor causes the connector cup to rotate with respect to the anchor housing causing the camera device to rotate.

18 Claims, 19 Drawing Sheets

(51) Int. Cl.
*B64C 39/02* (2006.01)
*H04N 5/232* (2006.01)
*B64D 47/08* (2006.01)

(56) References Cited

U.S. PATENT DOCUMENTS

| | | | |
|---|---|---|---|
| 6,707,761 | B2 | 3/2004 | Erikson |
| 8,654,189 | B1 * | 2/2014 | Spangler ................ H04N 7/183 348/81 |
| 9,350,926 | B2 * | 5/2016 | Wu ........................... B60R 1/00 |
| 9,654,984 | B2 * | 5/2017 | Priest ................... H04W 16/18 |
| 2006/0280034 | A1 | 12/2006 | Howard et al. |
| 2007/0242134 | A1 * | 10/2007 | Zernov ................ H04N 5/2252 348/81 |
| 2010/0095559 | A1 * | 4/2010 | Buckner ............... E02F 3/8825 37/304 |
| 2011/0169938 | A1 * | 7/2011 | Webster ................ F22B 37/002 348/82 |
| 2011/0221934 | A1 * | 9/2011 | Simon .................. H04N 5/2259 348/240.3 |
| 2013/0112440 | A1 * | 5/2013 | Alsaif .................... A62C 27/00 169/46 |
| 2014/0153916 | A1 | 6/2014 | Kintner |
| 2014/0160290 | A1 * | 6/2014 | Wu ........................... B60R 1/00 348/148 |
| 2014/0176717 | A1 * | 6/2014 | De Paschoal ........... B60R 11/04 348/148 |
| 2014/0311735 | A1 * | 10/2014 | Landrith, II .......... E21B 33/064 166/250.04 |
| 2014/0327773 | A1 * | 11/2014 | Scott-Cook ...... G08B 13/19647 348/148 |
| 2016/0173741 | A1 * | 6/2016 | Wolfenbarger ........ G03B 17/08 348/81 |
| 2017/0000677 | A1 * | 1/2017 | Prince .................... A61G 15/16 |
| 2017/0227162 | A1 * | 8/2017 | Saika ..................... F16M 13/02 |
| 2017/0297707 | A1 * | 10/2017 | Rollefstad ............. B64C 39/024 |
| 2017/0300051 | A1 * | 10/2017 | Zhou .................... G05D 1/0038 |
| 2017/0318325 | A1 * | 11/2017 | Ortiz .................... H04N 21/436 |
| 2017/0324897 | A1 * | 11/2017 | Swaminathan ......... H02J 50/10 |
| 2018/0035606 | A1 * | 2/2018 | Burdoucci ........... A01D 34/008 |

* cited by examiner

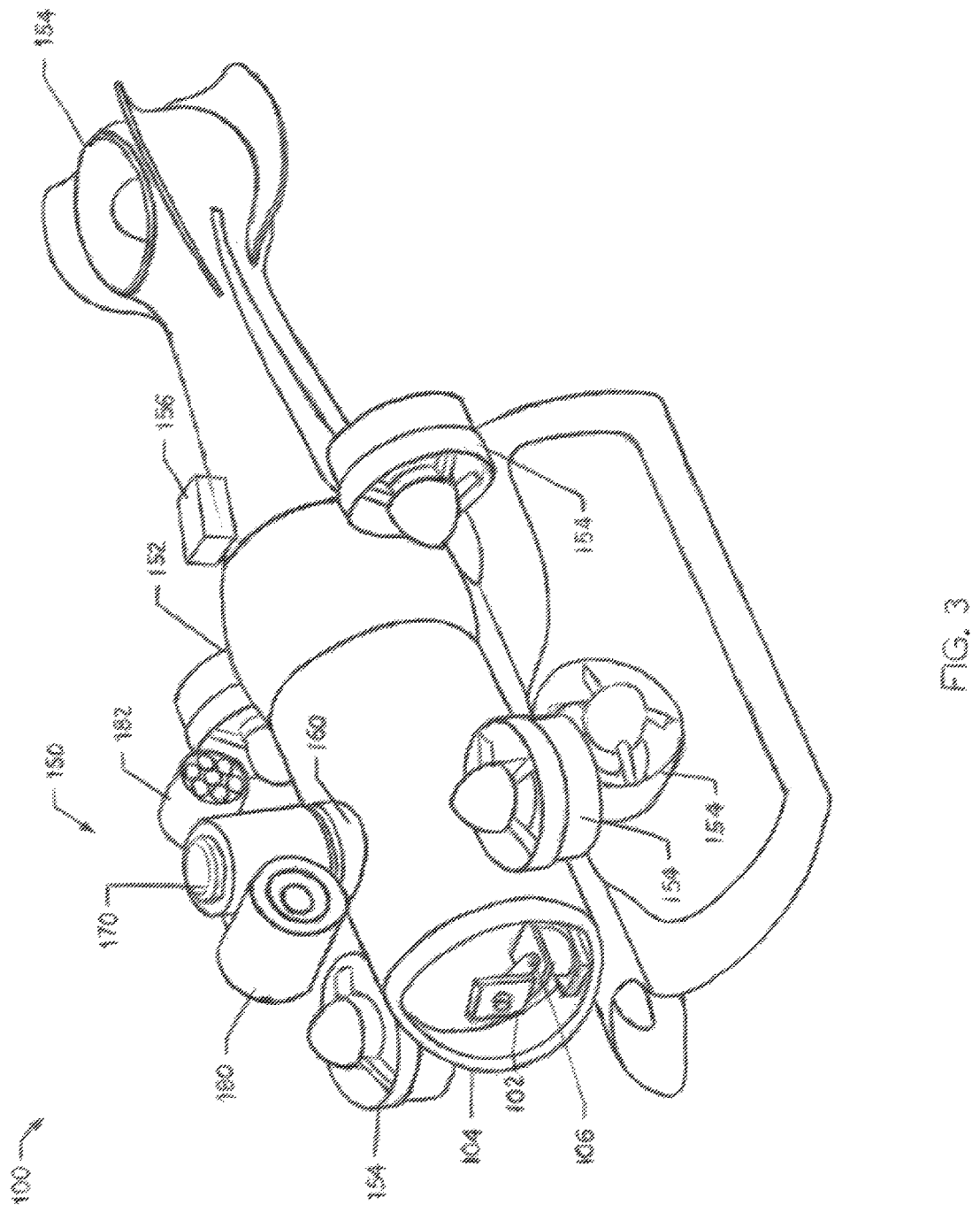

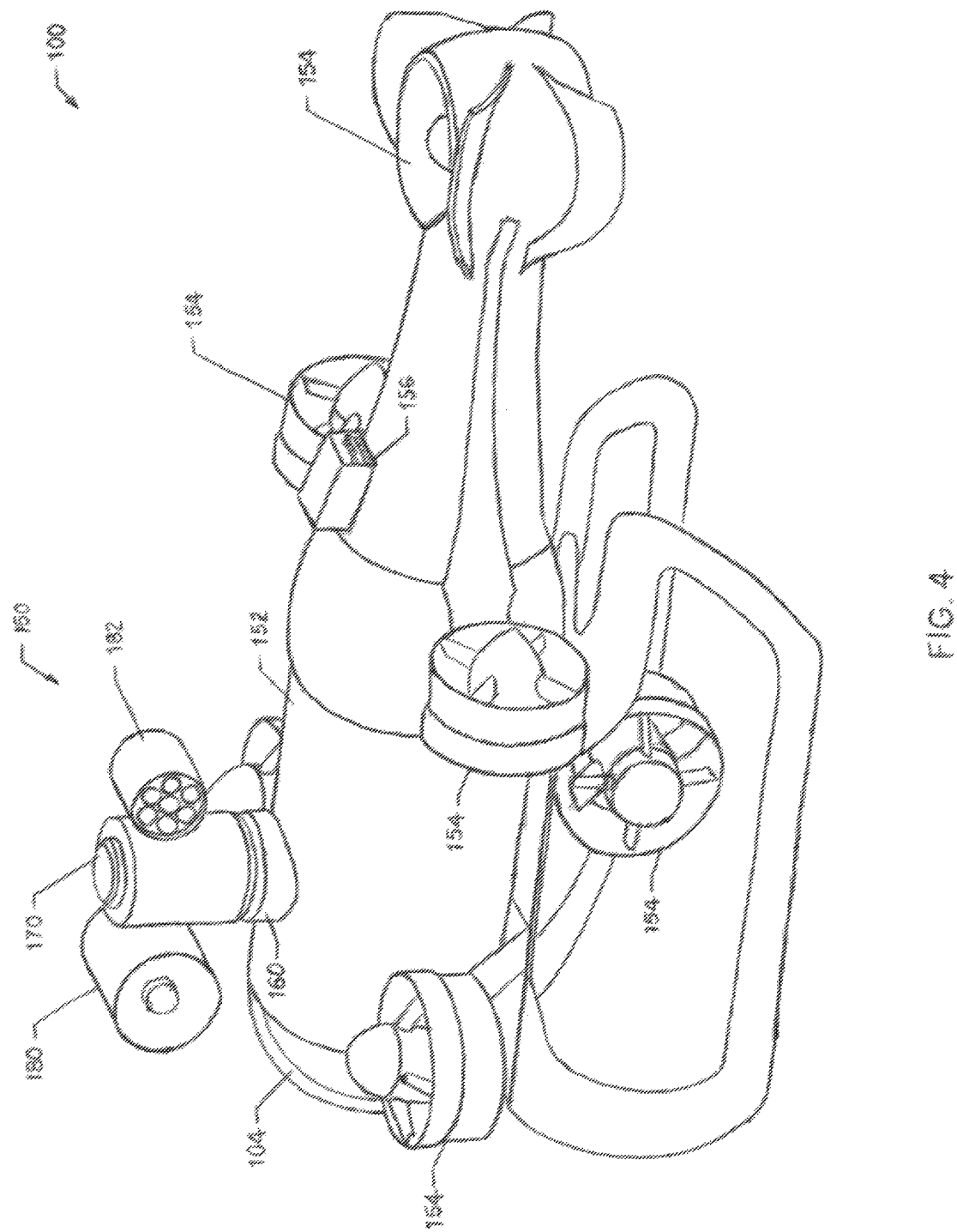

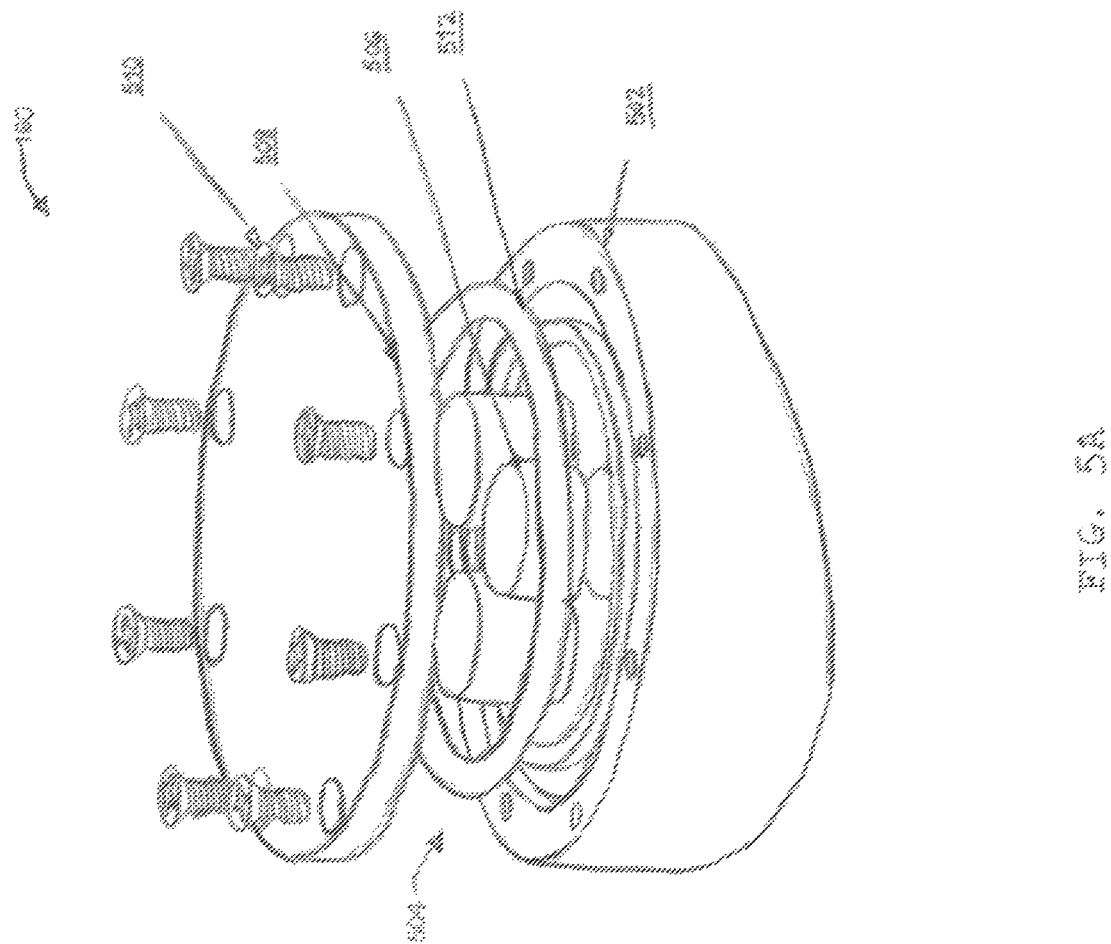

SECTION A-A

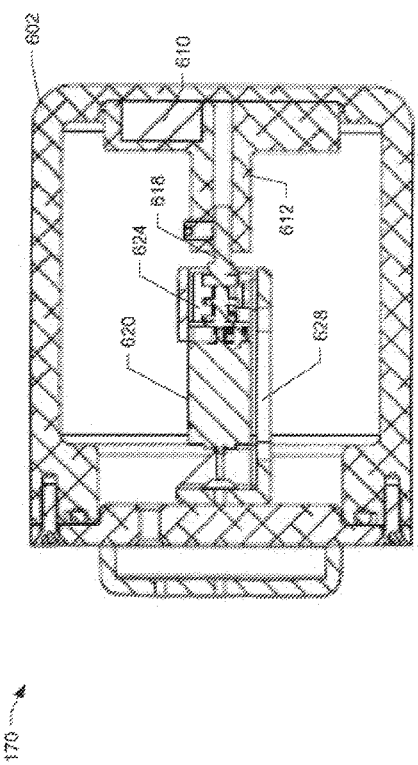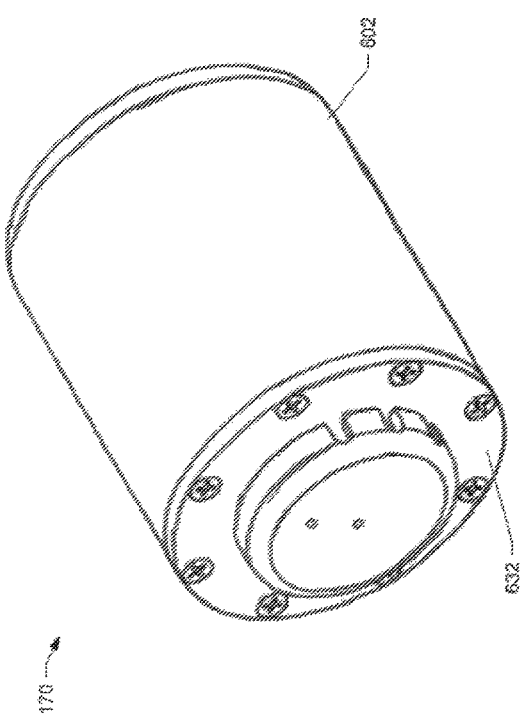

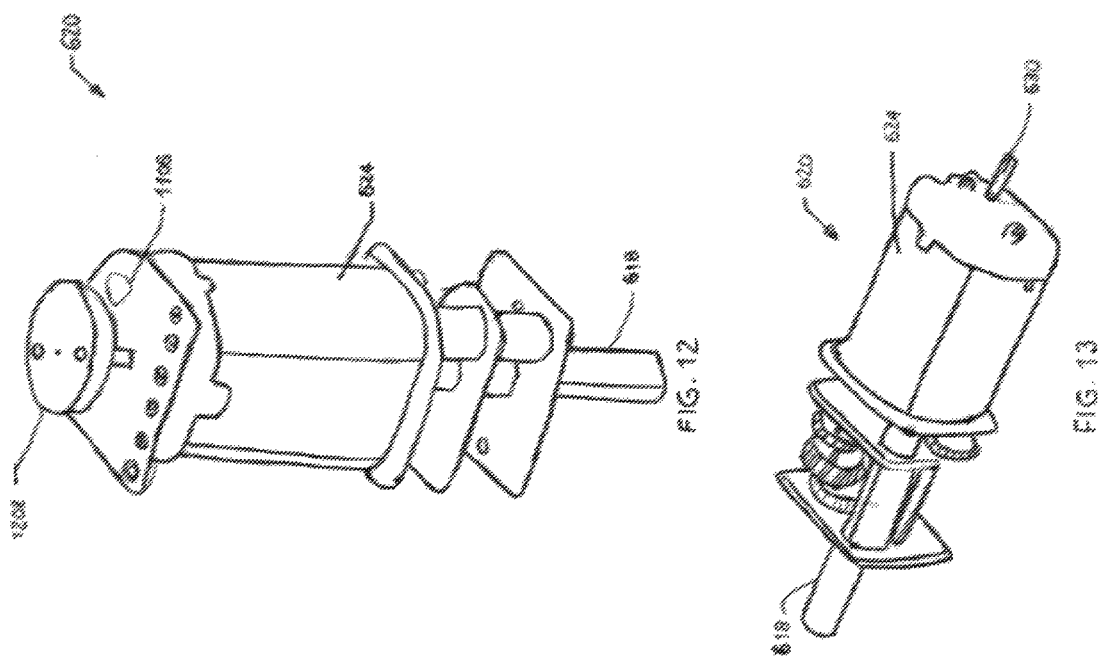

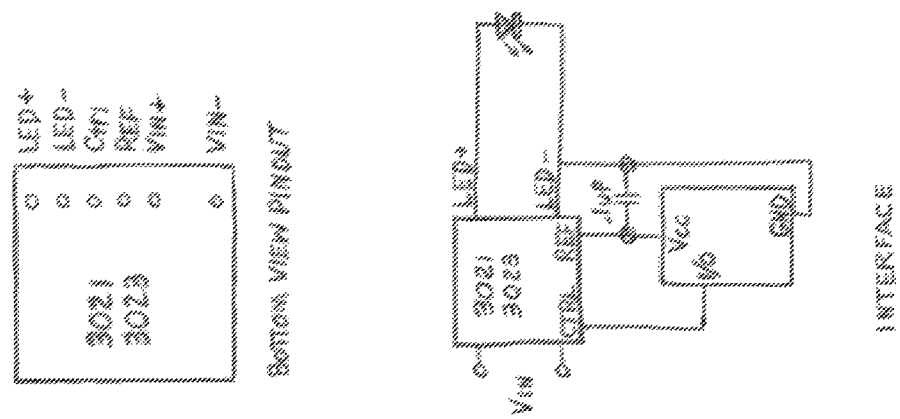
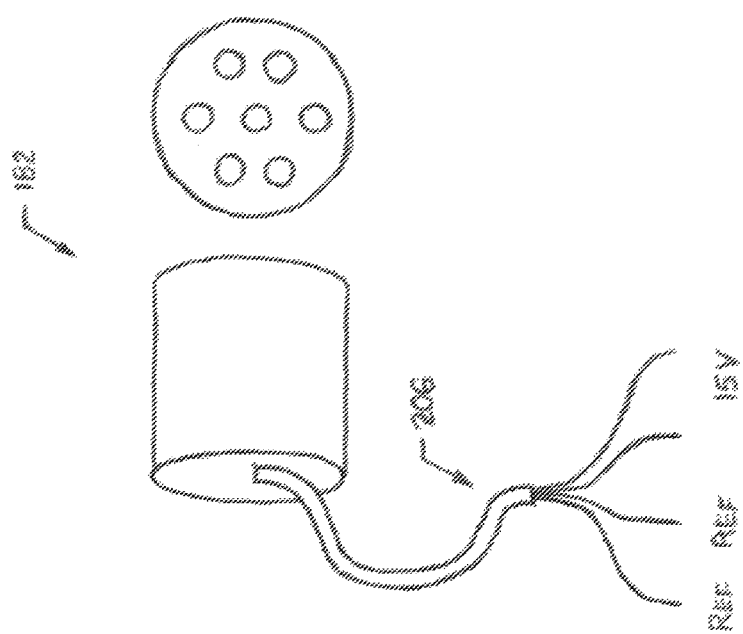
FIG. 16

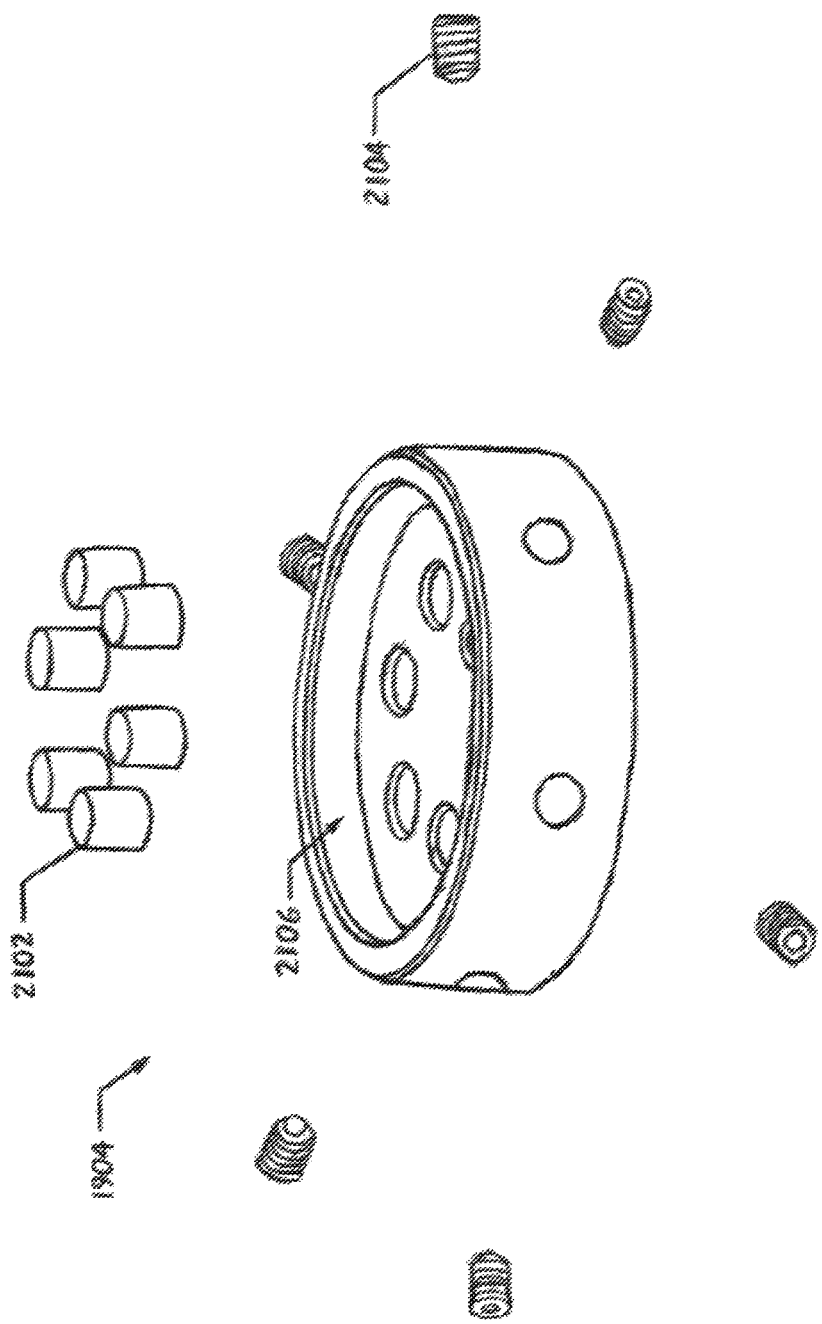

REMOTELY OPERATED VEHICLE CAMERA APPARATUS

PRIORITY

This application claims priority to U.S. Provisional Application No. 62/447,666, entitled "Remotely Operated Vehicle Camera Apparatus", filed Jan. 18, 2017, the entire contents of which is incorporated herein by reference and relied upon.

BACKGROUND

Current underwater remotely operated vehicles ("ROVs") have a single stationary camera, an interior-based moveable camera, and multiple cameras. Each of these camera configurations has significant drawbacks, which limit the functionality and usefulness of related ROVs. For instance, ROVs with a single stationary camera usually are configured such that the camera faces forward in a cockpit or forward compartment. The ROV 100 of FIG. 1, for example, includes a forward-facing camera 102 located in a forward compartment 104. The camera 102 is pointed in a forward-facing direction with respect to the ROV 100. The camera 102 enables, for example, an operator to view what is in front of the ROV 100. While the camera 102 is adequate for navigation, the camera 102 is limited in its ability to record what is around the ROV 100. This lack of omnidirectional ability severely limits the ROV in reconnaissance and inspection procedures.

For instance, to adequately record a certain physical structure (such as a submerged hull of a ship or a water tank), the entire ROV 100 would have to be moved along the entire inspection area. This can be especially burdensome underwater, given changing currents. Moreover, this inspection can be very difficult given some tightly enclosed underwater spaces where the ROV 100 may not have sufficient room to turn or maneuver.

In addition, the camera 102 is enclosed within the airtight forward compartment 104. Curvature of the glass enclosing the compartment 104 may enlarge, blur, or otherwise distort images recorded by the camera. In some instances, the camera 102 may be moveable within the compartment 104. For example, motors controlling moveable support 106 may be instructed to point the camera 102 upward or downward. In addition, the motors may cause moveable support 106 to rotate, thereby providing lateral movement for the camera 102. While the movement provides different viewing angles, the camera 102 is still restricted behind the glass within the forward compartment 104.

Other known ROVs use multiple cameras to increase viewing angles. However, the use of multiple cameras introduces new problems. For instance, multiple cameras produce respective video streams, which have to be joined together or viewed at the same time. Synchronizing or viewing multiple video streams may overwhelm a single operator, who may lose track of which camera is viewing which portion of a structure. In addition, most of the time, only one or two of the cameras provide useful images, thereby rendering the other cameras useless at times. An operator may selectively view streams from only a camera of interest. However, as the ROV moves, the operator may have to change cameras, which complicates the entire procedure. This also makes auditing and feedback more complex since only small portions of an entire video stream may prove useful at any given time.

SUMMARY

The present disclosure involves a rotatable camera apparatus for an ROV. The example camera apparatus is mounted to a side of the ROV and is configured to rotate, preferably 360°. The camera apparatus is configured to connect to an open-water underwater camera device and/or an open-water underwater light source. Rotation of the camera apparatus causes the camera device and/or light source to rotate likewise, enabling an operator to have a completely unobstructed 360° view in an underwater environment.

In an example embodiment, a camera apparatus comprises an anchor housing connected to body of a remotely operated vehicle. The anchor housing includes a first magnet, a base cup including an interior recess section configured to hold the magnet stationary, and a base plate connected to the base cup configured to enclose the magnet. The example camera apparatus also includes a camera connection housing configured to be rotatably connected to the anchor housing and a camera device mechanically coupled to the camera connection housing. The camera connection housing includes a connector cup comprising a closed end configured to contact the base plate of the anchor housing, an open end configured to connect to the camera device, and an interior section. The camera connection housing also includes a second magnet located at an interior side of the closed end of the connector cup, the second magnet configured to magnetically couple to the first magnet. The camera connection housing further includes a magnet plate comprising a magnet end configured to secure the second magnet to the interior side of the closed end of the connector cup and a motor engagement end. Moreover, the camera connection housing includes a motor assembly comprising a motor configured to rotate a drive shaft, the drive shaft connected to the motor engagement end of the magnet plate, a motor bracket mechanically coupled to the motor assembly, and a coupling cover connected to the open end of the connector cup configured to enclose the interior section of the connector cup, the coupling cover being mechanically connected to the motor bracket.

In another embodiment, a remotely operated vehicle apparatus comprises an anchor housing connected to a body of the remotely operated vehicle. The anchor housing includes a first magnet and base cup configured to hold the magnet stationary. The remotely operated vehicle apparatus also comprises a camera connection housing configured to be rotatably connected to the anchor housing. The camera connection housing includes a connector cup configured to contact the anchor housing, a second magnet located inside the connector cup, the second magnet configured to magnetically couple to the first magnet, a magnet plate configured to retain the second magnet inside of the connector cup, and a motor assembly including a motor configured to rotate a drive shaft, the drive shaft being connected to the magnet plate. The remotely operated vehicle apparatus moreover includes a camera device mechanically coupled to the camera connection housing. Actuation of the motor causes the connector cup to rotate with respect to the anchor housing while being magnetically coupled to the anchor housing. Accordingly, actuation of the motor causes the camera device to rotate while being attached to an exterior of the remotely operated vehicle apparatus.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE FIGURES

FIGS. 1 to 4 show diagrams that illustrate an ROV that includes a rotatable camera apparatus having an anchor housing and a camera connection housing, according to an embodiment of the present disclosure.

FIGS. 5A and 5B show diagrams that illustrate an exploded view of the anchor housing of FIGS. 1 to 4, according to an embodiment of the present disclosure.

FIGS. 7 to 10 show diagrams that illustrate assembled views of the camera connection housing of FIG. 6, according to embodiments of the present disclosure.

FIGS. 11 to 16 show diagrams that illustrate components of the camera connection housing of FIG. 6, according to embodiments of the present disclosure.

FIG. 21 shows a diagram that illustrates a gear assembly of FIG. 20, according to an example embodiment of the present disclosure.

DETAILED DESCRIPTION

Figure 1:
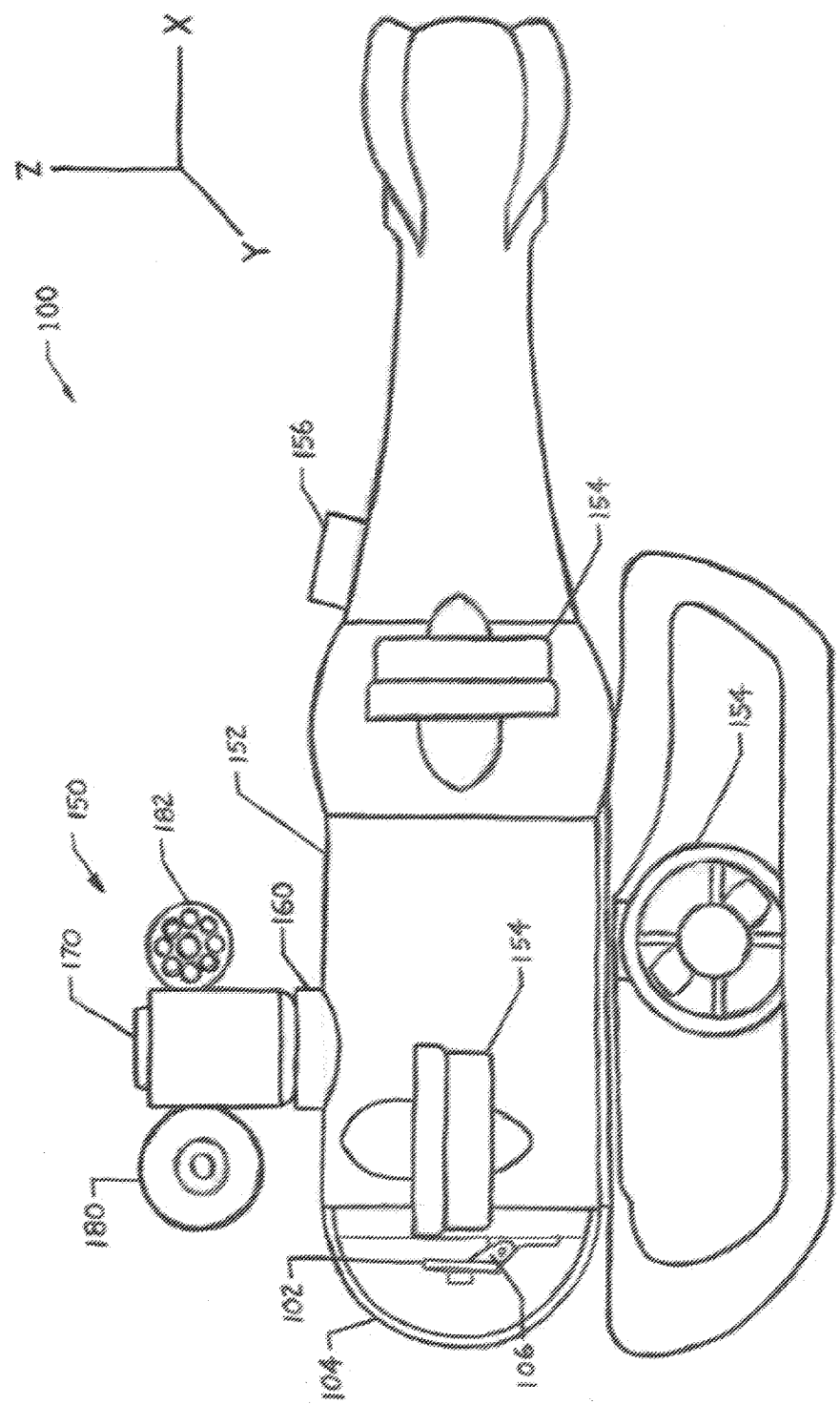

The present disclosure relates in general to a rotatable camera apparatus for an ROV. The example camera apparatus includes an anchor housing immovably connected to a body of an ROV. The camera apparatus also includes a camera connection housing that is rotatably connected to the anchor housing. In an embodiment, the anchor housing is rotatably connected to the camera connection housing through magnetic coupling. In another embodiment, the anchor housing is rotatably connected to the camera connection housing through a ball bearing connector.

The example rotatable camera apparatus enables an operator to have a controllable 360° view without having to position or move an entire ROV. The maneuverability of the rotatable camera apparatus allows the ROV to be used for a wide variety of underwater applications including inspection procedures, reconnaissance missions, wildlife viewing, etc. In addition, the magnetic coupling between the anchor housing and the camera connection housing prevents water from entering the ROV, thereby facilitating use at greater depths.

Reference is made throughout to underwater ROVs. It should be appreciated that the disclosed camera apparatus is not limited to underwater vehicles. For example, the disclosed camera apparatus may be part of an above-water ROV or manned boat. In other embodiments, the disclosed camera apparatus may be included on an unmanned aerial vehicle ("UAV"), drone, airplane, or high altitude platform.

FIGS. 1 to 4 show diagrams that illustrate an ROV 100 that includes a rotatable camera apparatus 150. The ROV 100 may include any type of vehicle. For example, the ROV 100 of FIGS. 1 to 4 is configured to operate underwater. The example ROV 100 includes a housing or body 152 configured to enclose control electronics, power electronics, and/or a power supply. The electronics and/or power supply are configured to control, for example, rotation rates and timing of propellers 154. The body 152 includes a front compartment 104, which encloses camera 102 and camera support 106. The example camera 102 provides a forward facing view that enables an operator to navigate the ROV 100. The ROV 100 also includes a junction box 156, which provides a coupling for one or more control and/or power wires. The wires may route to a surface vessel or control station, which is used to control the ROV 100. The surface vessel or control station may also provide power for the ROV 100.

Anchor Housing Embodiments

Figure 5B:
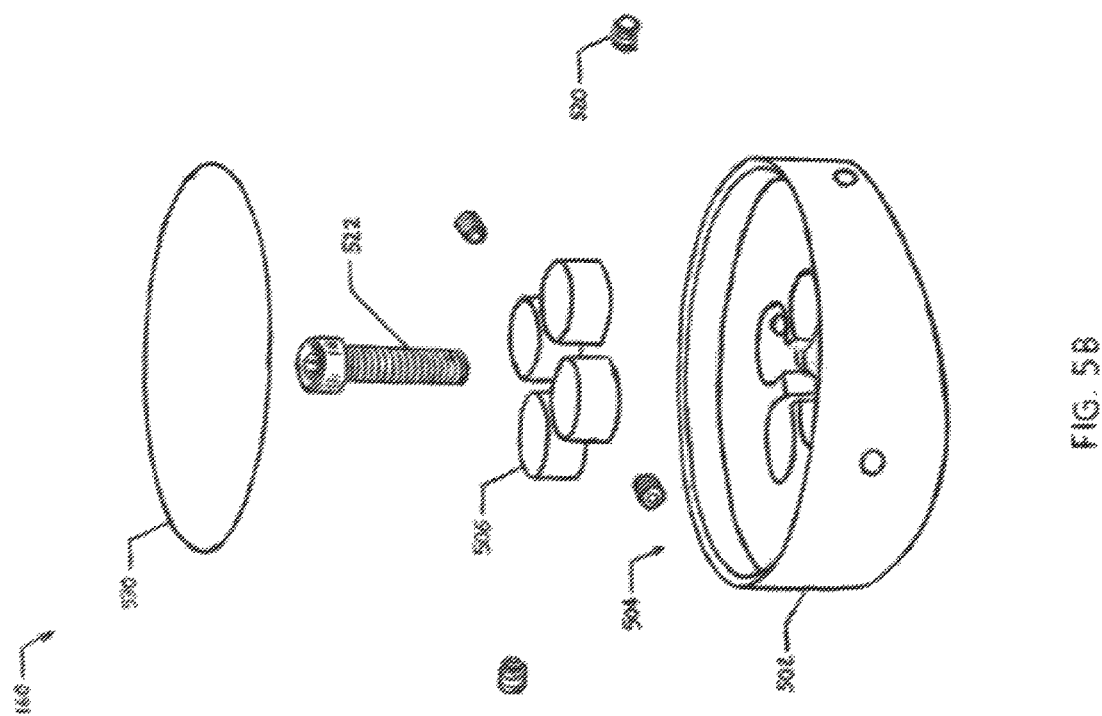

The rotatable camera apparatus 150 includes an anchor housing 160 that is connected to the body 152 of the ROV 100. In an embodiment, the anchor housing 160 is connected to the body 152 such that the anchor housing 160 is stationary. The stationary connection between the anchor housing 160 and the body 152 of the ROV 100 enables the connection to be airtight. FIG. 5A shows an exploded view of the anchor housing 160, according to an embodiment of the present disclosure. FIG. 5B shows an exploded view of the anchor housing 160, according to another example embodiment of the present disclosure. The anchor housing 160 of FIGS. 5A and 5B includes a base cup 502 that includes an interior recess section 504 configured to enclose magnet(s) 506. The interior section 504 may include, for example chambers that are configured to accept the magnets 506. Such a configuration holds the magnets 506 in place and prevents, for example, the magnet from collectively rotating. While FIG. 5A shows three magnets 506, it should be appreciated that fewer or additional magnets may be used. For example, the anchor housing of FIG. 5B includes four magnets 506. Alternatively, the magnets may be omitted when non-magnetic coupling components are used.

The anchor housing 160 of FIG. 5A includes a base plate 508 configured to connect to the base cup 502 via screws 510. The base plate 508 is configured to enclose the interior section 504 of the base cup 502 including the magnets 506. The example anchor housing 160 also includes an o-ring 512 to provide, for example, a watertight seal for the interior section 504. In some embodiments, the interior section 504 may include a channel or recess section to accommodate the o-ring 512.

As shown in FIG. 5B, the anchor housing 160 may include setscrews 520 configured to secure magnets 506 within interior recess section 504. Additionally, the anchor housing 160 may include a positioning screw 522, such as a cap screw, which is configured to secure magnets 506 within interior recess section 504. For example, setscrews 520 and positioning screw 522 may provide opposing compressive forces on the sidewalls of magnets 506 to secure the magnets 506 within the anchor housing 160. In addition to setscrews 520 and/or positioning screw 522, the anchor housing 160 may include a film 530. The film 530 may include an acrylic film with an adhesive on a bottom side to secure magnets 506 within interior recess section 504. The film 530 may also provide a watertight seal for the interior section 504. The adhesive may be cross-linkable and deliver resistance to varying temperature ranges, chemical exposure, ultraviolet light, and oxidation. In some embodiments, the film 530 may be replaced or used in conjunction with a base plate, such as the base plate 508 shown in FIG. 5A.

In some embodiments, components from both of FIGS. 5A and 5B may be included in the anchor housing 160. For example, the anchor housing 160 may include the o-ring 512, the film 530, and the base plate 508. In addition, the setscrews 520 may be used in conjunction with the screws 510.

The base plate 508 and base cup 502 may comprise any material including, for example, machined metal, injection molded metal, machined plastic, injection molded plastic, fiberglass, carbon fiber, etc. Further, while the base plate 508 and base cup 502 are shown as having a circular or cylindrical shape, it should be appreciated that they could include other shapes, such as an ovular shape, a rectangular shape, a triangular shape, etc.

Camera Connection Housing Embodiments

Figure 17:
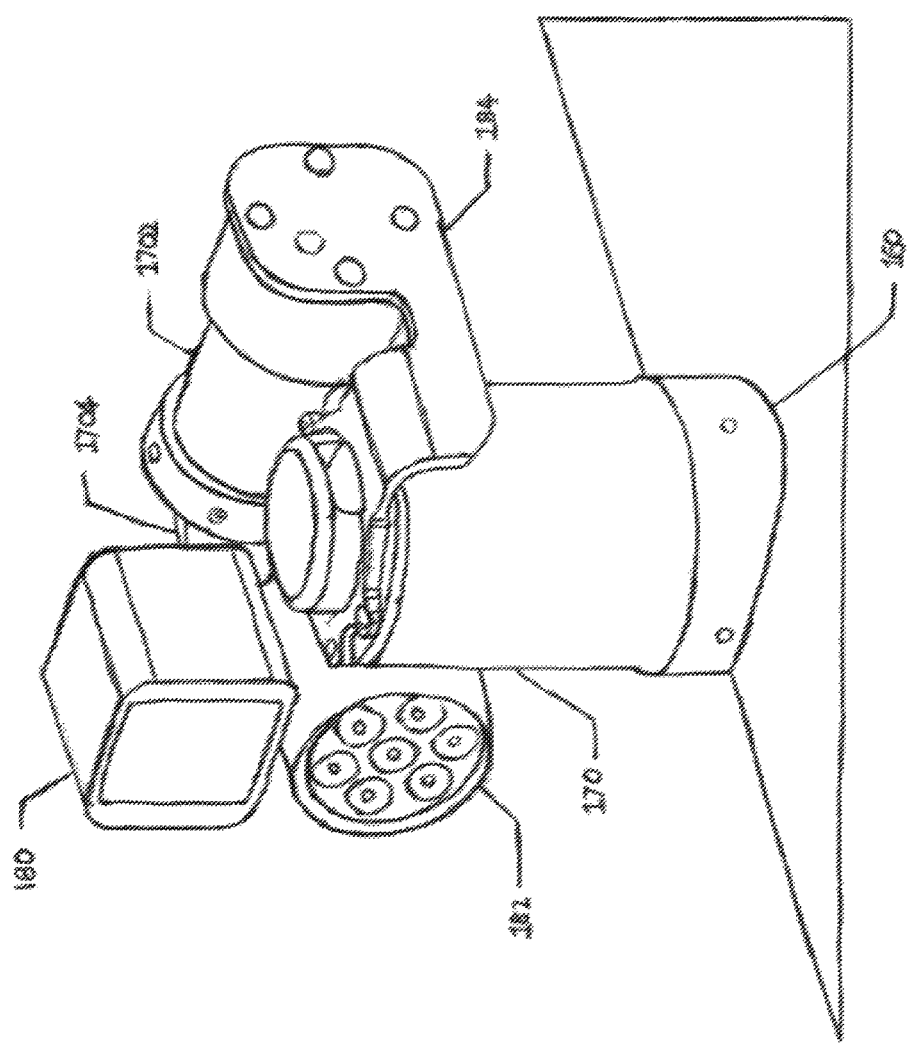
FIGS. 17 and 18 show diagrams that illustrate a rotatable camera apparatus, according to an embodiment of the present disclosure.
Figure 18:
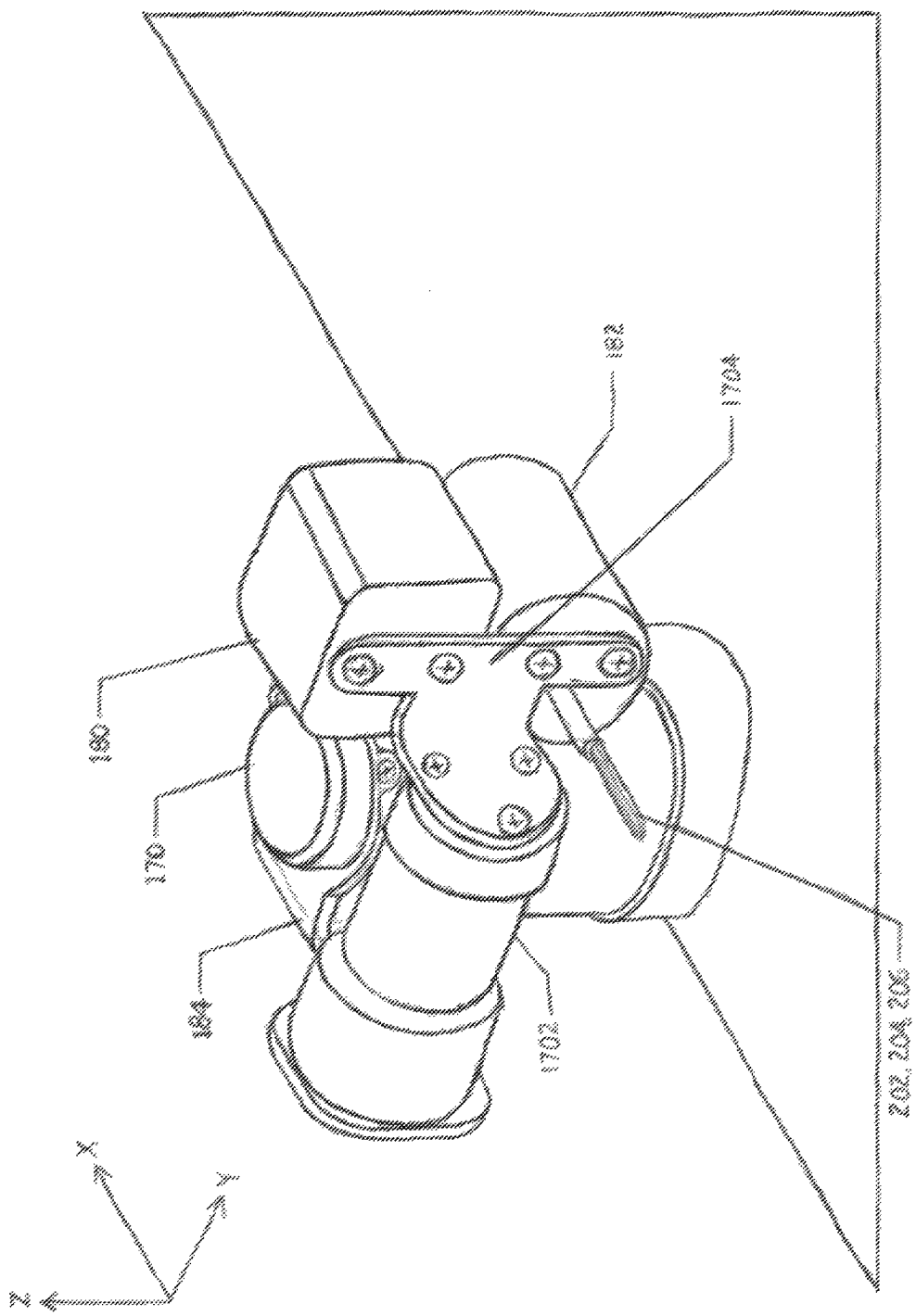

The example rotatable camera apparatus 150 of FIGS. 1 to 4, 17 and 18 includes a camera connection housing 170 configured to be rotatably connected to the anchor housing 160. The camera connection housing 170 is mechanically coupled to a camera device 180 and a lighting device 182. The rotatable connection between the camera connection housing 170 and the anchor housing 160 enables the camera device 180 and the lighting device 182 to be rotatable about a z-axis in an x-y plane (as shown in FIGS. 1 and 18).

1. Camera Device and Lighting Device Embodiments

Figure 2:
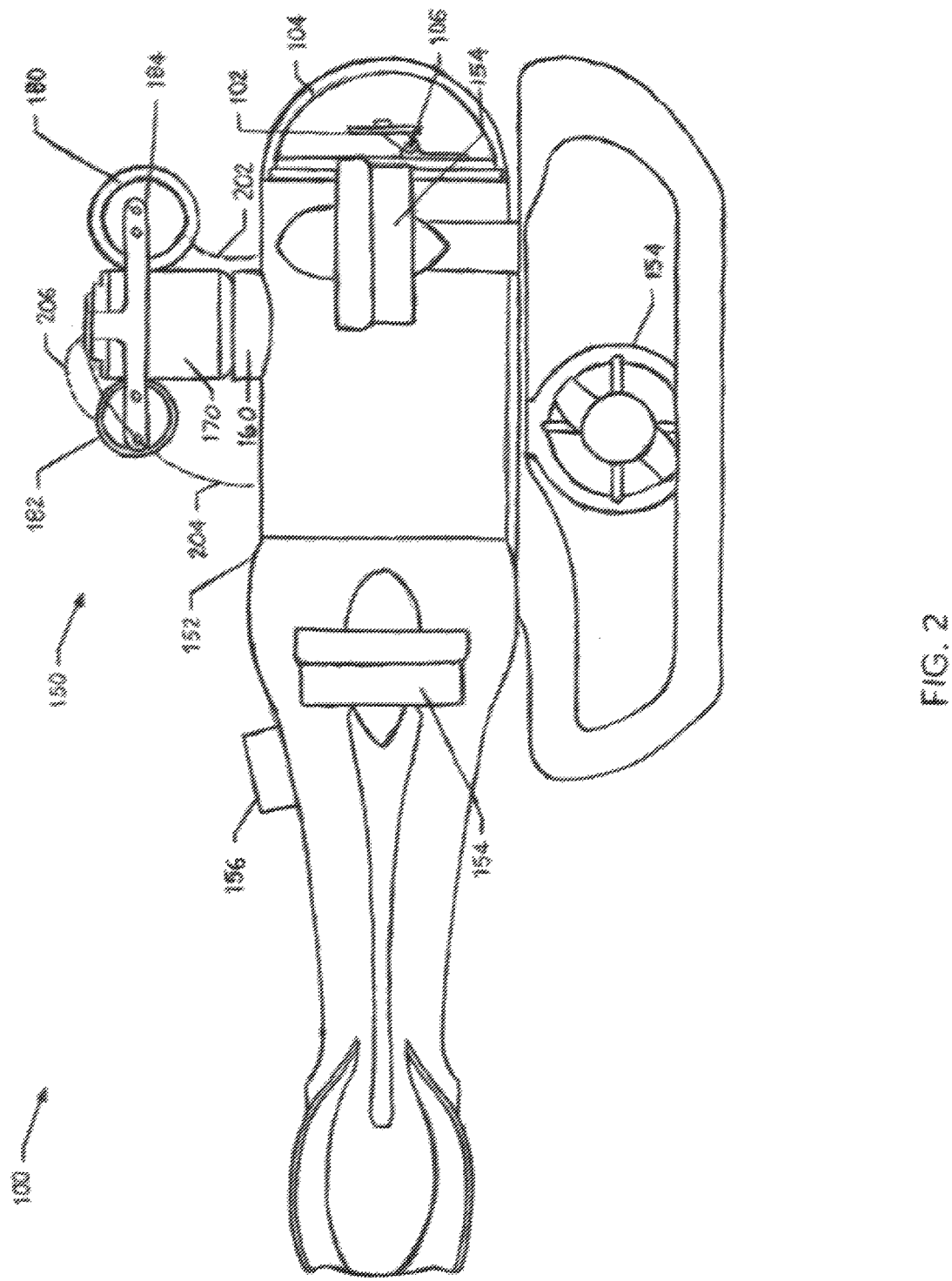

The example camera connection housing 170 is mechanically connected to the camera device 180 and the lighting device 182 via a bracket 184. FIG. 2 shows an example of the bracket 184, which has a T-shape. The bracket 184 is configured to connect to rear sides of the camera device 180 and the lighting device 182 in addition to a top side of the camera connection housing 170.

Figure 8:
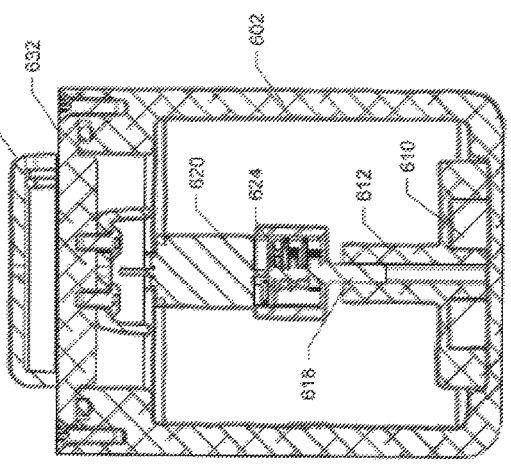

FIGS. 17 and 8 show another example of the bracket 184, which includes a motor housing 1702 (described in more detail in FIG. 19) and a bracket 1704. The bracket 184 is coupled to the camera connection housing 170 and the motor housing 1702, which is additionally coupled to the bracket 1704. In addition, the bracket 1704 is coupled to the camera device 180 and the lighting device 182. In an example, the bracket 184, the motor housing 1702, and the bracket 1704 may be combined to form a single piece.

In some instances, the bracket 184 of FIGS. 1 to 4, 17, and 18 may be connected to a hinge, thereby enabling the bracket 184 to be rotated so that camera device 180 and lighting device 182 can be pointed upwards or downwards. In these examples, the bracket 184 may be connected to a motor via a control arm. For example, rotatable camera apparatus 150 may include a pan and tilt assembly (described in more detail below) to rotate the camera device 180 and/or lighting device 182 about the y-axis in the x-z plane (as shown in FIG. 1 and FIG. 18).

While FIGS. 1 to 4, 17 and 18 show the connection of one camera device 180 and lighting device 182, more than one camera device and/or lighting may be used. For example, the lighting device 182 may be replaced with another camera device and/or the camera device 180 may be replaced by another lighting device. Additionally or alternatively, a camera device and lighting device may be coupled to bracket 184 to point 180 degrees opposite from the illustrated camera device 180 and lighting device 182.

The example camera device 180 includes any camera configured to operate in an environment of the ROV 100. For example, the camera device 180 may include an underwater camera. The camera device 180 may be configured to record photographic images and/or video images. Further, the camera device 180 may include a lens capable of zooming in/out and/or focusing.

The example lighting device 182 is configured to project one or more light beams to illuminate a target imaged by the camera device 180. The lighting device 182 includes any device configured to project one or more light beams through an environment of the ROV 100. The lighting device 182 may include for example, a 2200-rated lumen LED. The lighting device 182 may be configured to project a constant light beam. Additionally, in some embodiments, the lighting device 182 may be configured to pulse or strobe a light beam according to one or more control signals/instructions.

The example camera device 180 and the lighting device 182 are configured with respect to the camera connection housing 170 to face the same direction. Such a configuration enables the camera device 180 to record images of a target that is illuminated by the lighting device 182. FIGS. 1 to 4 show that the camera device and the lighting device 182 may be on opposite sides of the camera connection housing 170. The mounting of the camera device 180 opposite from the lighting device 182 on camera connection housing 170 may reduce glare at the camera device 180 from the lighting device 182.

In an alternative embodiment, FIGS. 17 and 18 show that the camera device 180 and the lighting device 182 may be positioned in a stacked arrangement (e.g., on top of one another) on the same side of camera connection housing 170. The stacked configuration provides light in line with the camera device 180 and reduces shadows from the resulting images and/or video. Additionally, the stacked configuration provides a relatively smaller footprint for the rotatable camera apparatus 150 such that it can be positioned in tighter areas.

The example camera device 180 and the lighting device 182 are electrically and/or communicatively coupled to electronics within the ROV 100 via one or more wires. FIG. 2 shows the camera device 180 connected to the ROV 100 via wire 202, which may include a USB or mini-USB cord. The camera device 180 receives power and control signals (which originate from a surface power source and control station) via the wire 202. The camera device 180 transmits recorded images (to the surface control station) via the wire 202.

The example lighting device 182 receives power and/or control signals via wires 204 and 206. In the illustrated example of FIG. 2, power and/or control signals are provided via wire 204 from the ROV 100. The wire 204 is configured to connect to electronics within the camera connection housing 170 to control, for example, an internal motor. Control and/or power is then routed from inside the camera connection housing 170 to the lighting device 182 via wire 206. The control signals may include instructions and/or indications regarding a pulse and/or strobe of the lighting device 182. For example, a pulse-width modulation ("PWM") signal may be applied to the lighting device 170 to control the frequency of pulsing. In the illustrated example of FIG. 18, wires 202, 204, and 206 may be grouped and routed through the housings to a single exit point.

2. Camera Connection Housing Assembly Embodiments

Figure 6:
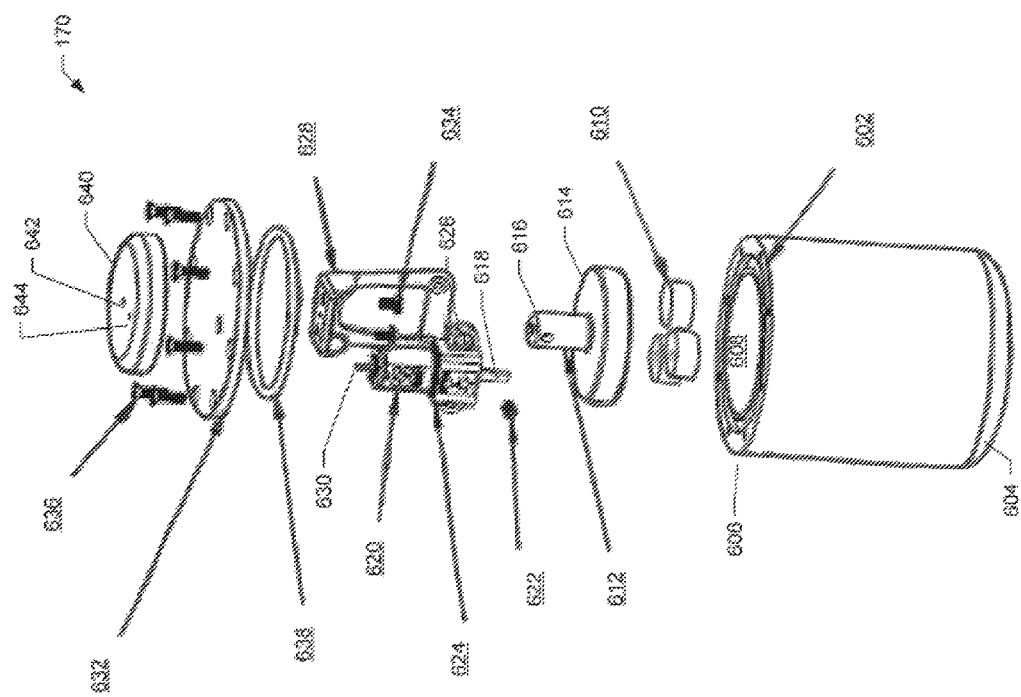
FIG. 6 shows a diagram illustrating an exploded view of the camera connection housing of FIGS. 1 to 4, according to an example embodiment of the present disclosure.

FIG. 6 shows a diagram illustrating an exploded view of the camera connection housing 170 of FIGS. 1 to 4, 17 and 18, according to an example embodiment of the present disclosure. The example camera connection housing 170 includes a connector cup 602 configured to connect to the anchor housing 160. In some embodiments, the connector cup 602 has a diameter that is substantially the same as the anchor housing 160. The diameter is between an inch and twelve includes, preferably, between two and four inches. The connector cup 602 includes a closed end 604 that is configured to contact the anchor housing 160. The connector cup 602 also includes an open end 606 configured to expose an interior section 608.

The example camera connection housing 170 also includes one or more magnets 610 that are located at the closed end 604 of the connector cup 602. The one or more magnets 610 are held in place or secured by a magnet plate 612. The example magnet plate 612 includes a cylindrical-shaped magnet end 614 that includes recess sections to accommodate the magnets 610. The diameter of the cylindrical-shaped magnet end 614 may be substantially equal to a diameter of the interior section 608 of the connector cup 602. The magnet plate 612 also includes a cylindrical-shaped motor end 616 configured to connect to a drive shaft 618 of motor assembly 620. A socket screw 622 may be used to secure the drive shaft 618 to the cylindrical-shaped motor end 616. Additionally, setscrews may be used to secure the magnets 610 within the magnet plate 612. In an example, each magnet 610 may be secured by a respective setscrew within the magnet plate 612. The setscrews may firmly position the magnets 610 within the magnet plate 612 to reduce or eliminate movement and/or vibration of the magnets 610 during rotation.

The example motor assembly 620 includes a motor 624 configured to rotate the drive shaft 618. The motor assembly 620 also includes a bracket connector 626 configured to mechanically couple to bracket 628 via respective screws. The motor assembly 620 also includes a reference shaft 630 that is configured to provide an indication of a rotation of the drive shaft 618. An encoder may be connected to the reference shaft 630 to determine rotation of the drive shaft 618 to provide rotational feedback control. The encoder may be a mechanical encoder, optical encoder, magnetic encoder, capacitive encoder, etc.

In some embodiments, data from the encoder may be transmitted to an operator to indicate a position of the camera device 180 with respect to the ROV 100. For example, a user interface device may display a graphical field-of-view of the camera device 180 using the data from the encoder to show which direction the camera device 180 is pointed. Such information may provide an operator with orientation information for controlling rotation (and/or pan, tilt, zoom, etc.) of the camera connection housing 170.

Returning to FIG. 6, the example motor assembly 620 is secured to the connector cup 602 via the bracket 628, which is connected to a coupling cover 632 via one or more screws 634. The coupling cover 632 is configured to connect to the open end 606 of the connector cup 602 to enclose the interior section 608. Screws 636 may secure the coupling cover 632 to the connector cup 602. In some embodiments, an o-ring 638 may be located within a channel at the open end 606 and contact a circular section of the coupling cover 632. The o-ring 638 may, for example, create a watertight barrier to prevent water from entering the interior section 608.

The example camera connection housing 170 further includes a wire cap 640 mechanically coupled to the coupling cover 632. The wire cap 640 includes at least one window to enable wires 604 and 606 to be routed to circuit boards within the interior section 608. The coupling cover 632 may also include at least one window to enable wires 604 and 606 to pass through. A perimeter of the windows of the coupling cover 632 and the wire cap 640 may include an o-ring or sealant to prevent water from entering along the wires 604 and 606. In some embodiments, a center of the wire cap 640 may include a first window 642 configured to accommodate wire 204, which is connected to body 152 of the ROV 100. Positioning of the first window in the center of the wire cap 640 reduces stress of the wire 204 since rotation of the camera connection housing 170 causes the wire 204 to rotate about its axis, rather than being moved or pulled. Second window 644 is located off-center of the wire cap 640 and configured to accommodate wire 606. Since the second wire 606 is routed between the camera connection housing 170 and the lighting device 182, the wire 606 remains static since both the camera connection housing 170 and the lighting device 182 rotate in the same manner.

The example wire cap 640, the coupling cover 632, and/or the connector cup 602 may comprise any material including, for example, machined metal, injection molded metal, machined plastic, injection molded plastic (e.g., thermoplastic), fiberglass, carbon fiber, etc. Further, while the wire cap 640, the coupling cover 632, and/or the connector cup 602 are shown as having a circular or cylindrical shape, it should be appreciated that they could include other shapes, such as an ovular shape, a rectangular shape, a triangular shape, etc.

Figure 7:
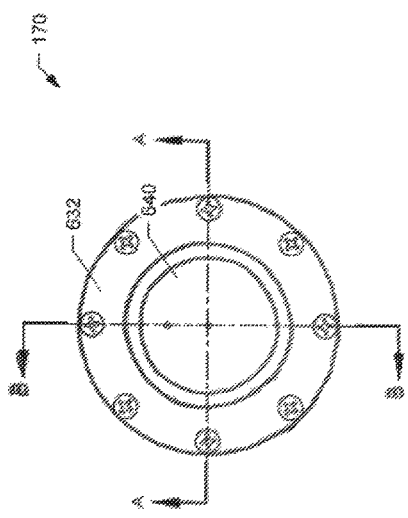

FIGS. 7 to 10 show assembled views of the camera connection housing 170, according to embodiments of the present disclosure. FIG. 7 shows a top-down or plan view of the camera connection housing 170. FIGS. 8 and 9 show cut-away side perspectives view of the camera connection housing 170 along respective sections A-A and B-B shown in FIG. 7. FIG. 10 shows an external side-perspective view of the camera connection housing 170.

As shown in FIGS. 8 and 9, the magnet plate 612 secures the magnets 610 to the closed end of the connector cup 602. The motor assembly 620 is connected to the magnet plate 612 and configured to actuate the drive shaft 618. When the connector cup 602 is attached to the anchor housing 160, the magnets 610 are attracted to magnets 506. This attraction causes the magnets 610 to rotate the magnet plate 612 such that each of the magnets 610 is aligned with a respective magnet 506. The magnetic coupling between the magnets 506 and 610 causes the connector cup 602, and more generally, the camera connection housing 170 to be rotatably connected to the anchor housing 160.

To rotate the connector cup 602 (including the camera device 180 and the lighting device 182), the motor 624 is actuated via one or more signals from wire 204. The motor 624 rotates the drive shaft 618. However, the drive shaft 618 is held in place by the magnet plate 612, which is secured in place by the magnetic coupling between magnets 506 and 610. In other words, the magnetic attraction between the magnets 506 and 610 prevents the magnet plate 612 from rotating. This static mechanical coupling causes the motor 624 to rotate itself around the drive shaft 618. The motor 624 is connected to the connector cup 602 (via bracket 628 and coupling cover 632). Rotation of the motor 624 thereby causes the connector cup 602 to rotate while being held against the anchor housing 160 via magnetic coupling of the magnets 610 and 506.

The configuration discussed in conjunction with FIGS. 5 to 10 enables the camera connection housing 170 to be connected to and rotate with respect to the anchor housing 160 without the use of components that may degrade in an aquatic environment. Further, such a configuration enables the camera connection housing 170 to be removable by an operator to transport the ROV 100. In some examples, the camera connection housing 170 may not be needed for some missions, and accordingly left unattached when the ROV 100 is in use. In other examples, an operator may possess different camera connection housings 170, each with a different configuration of camera devices and/or lighting devices. For example, an operator may have a standard camera on one housing 170 and a high-definition camera on another housing 170. The camera connection housing 170 may be easily removed, thereby enabling fast replacement.

In some examples, the closed end of the connector cup 602 and/or the base plate 508 may include a material to reduce rotational friction without disrupting the magnetic attractive force. However, some friction is still desired when, for example, the camera device 180 needs to remain steady for a period of time or to provide fine/precise rotational control. To reduce friction, a water insoluble coating may be applied to the connector cup 602 and/or the base plate 508. In other instances, a surface of the connector cup 602 and/or the base plate 508 may include a low-friction thin film, such as a carbon-based film. In yet other instances, the connector cup 602 and/or the base plate 508 may be integrated with a chemical solution having low-friction properties.

Pan and Tilt Assembly Embodiments

Figure 19:
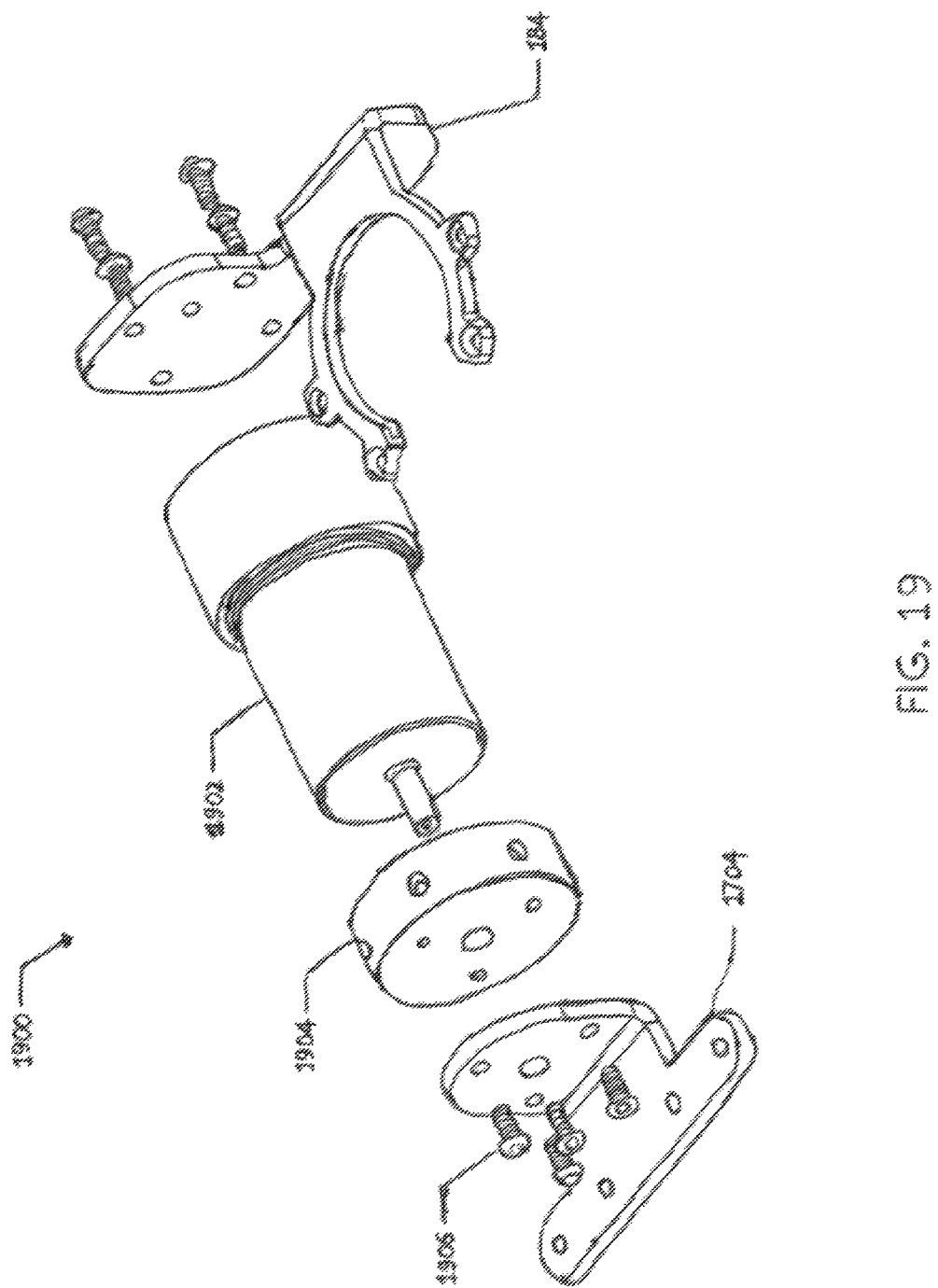
FIG. 19 shows a diagram that illustrates an exploded view of a pan and tilt assembly, according to an embodiment of the present disclosure.

In addition to rotating the camera device 180 and the lighting device 180 about the z-axis, the rotatable camera apparatus 150 may enable the camera device 180 and/or the lighting device 180 to be rotated about a secondary axis (e.g., the y-axis). FIG. 19 shows a diagram of a pan and tilt assembly 1900 that enables the camera device 180 and the lighting device 180 to be rotated upwards or downwards. The example pan and tilt assembly 1900 includes the bracket 184, the bracket 1704, a motor assembly 1902, and a gear assembly 1904. The motor assembly 1902 includes a motor cover 1907 configured to be mechanically coupled to the bracket 184 via screws 1909. The example bracket 1704 is configured to mechanically couple to the camera device 180, as shown in FIGS. 17 and 18. In addition, the bracket 184 includes a cup holder section 1905 configured to connect to the coupling cover 632 and/or the wire cap 640 of FIG. 6. The bracket 1704, shown in FIG. 19 is coupled to the gear assembly 1904 via screws 1906.

The example pan and tilt assembly 1900 also includes an alignment tab 1910 configured to position or align the gear assembly 1904 and the bracket 1704 with the motor assembly 1902. For example, the alignment tab 1910 is configured to pass through window 1912 in the gear assembly 1904 and window 1914 in the bracket 1704. As described in more detail below, the motor assembly 1902 is configured to rotate the gear assembly 1904 and the bracket 1704 about the alignment tab 1910.

Figure 20:
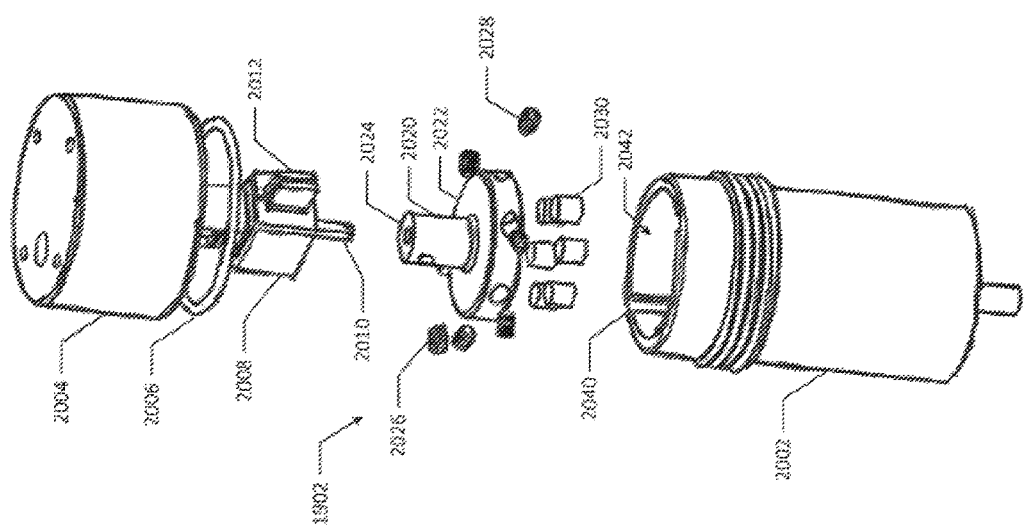
FIG. 20 shows a diagram that illustrates an exploded view of a motor assembly of FIG. 19, according to an example embodiment of the present disclosure.

FIG. 20 shows a diagram of the motor assembly 1902 of FIG. 19, which includes a motor shell 2002 and the motor cover 1907. The motor shell 2002 and the motor cover 2004 may be threadingly coupled together and may include an o-ring 2006 to form a watertight seal or barrier to prevent water from entering the rotational motor assembly 2000. In some embodiments, the o-ring 2006 may be located within a channel in the motor cover 2004 and/or motor shell 2002.

The example motor assembly 1902 includes a motor 2008 and a magnetic gear plate 2020 (e.g., similar to the magnet plate 612 of FIG. 6). The motor 2008 is configured to rotate a drive shaft 2010. The motor assembly 1902 also includes a bracket 2012 configured to position and mechanically couple the motor 2008 within the motor shell 2002 via slots 2040. The magnetic gear plate 2020 also includes a cylindrical-shaped motor end 2024 configured to connect to the drive shaft 2010 of rotational motor assembly 2000. A socket screw 2026 may be used to secure the drive shaft 2010 to the cylindrical-shaped motor end 2024.

The example motor assembly 1902 also includes one or more magnets 2030 that are located at the bottom end of the motor shell 2002. The one or more magnets 2030 are held in place or secured by the magnetic gear plate 2020. The example magnetic gear plate 2020 includes a cylindrical-shaped magnet end 2022 that includes recess sections to accommodate the magnets 2030. The diameter of the cylindrical-shaped magnet end 2022 may be substantially equal to a diameter of the interior section 2042 of the motor shell 2002.

Additionally, setscrews 2028 may be used to secure magnets 2030 within magnetic gear plate 2020. In an example, each magnet 2030 may be secured by a respective setscrew within magnetic gear plate 2020. For example, the setscrews may firmly position magnets 2030 within magnetic gear plate 2020 to reduce or eliminate movement and/or vibration of the magnets 2030 during rotation.

FIG. 21 shows a diagram of gear assembly 1904, which is configured to accommodate magnets 2102. The gear assembly 1904 includes an interior recess section 2106 configured to enclose the magnet(s) 2102. The interior section 2106 may include, for example chambers that are configured to accept the magnets 2102. Such a configuration holds the magnets 2102 in place and prevents, for example, the magnets 2102 from collectively rotating. While FIG. 21 shows six magnets 2102, it should be appreciated that fewer or additional magnets may be used.

In the illustrated example, set screws 2104 secure magnets 2102 within the interior recess section 2106 of the gear assembly 1904. For example, setscrews 2104 may provide opposing compressive forces on the sidewalls of magnets 2102 to press the magnets 2102 against their respective chamber walls. When the gear assembly 1904 is attached to the magnet motor assembly 1902, the magnets 2030 are attracted or magnetically coupled to the magnets 2102.

Returning to FIGS. 19 and 20, the motor 2008 is mechanically connected to the motor cover 1907. Rotation of the drive shaft 2010 causes the magnetic gear plate 2020 to rotate, which rotates the magnets 2030. The magnetic coupling between the magnets 2030 and the magnets 2102 causes the gear assembly 1904 to rotate around the alignment tab 1910. In addition, the bracket 1704, which is mechanically coupled to the gear assembly 1904 also rotates, thereby causing the camera device 180 and/or the lighting device 182 to pan/tilt. For example, as shown in FIGS. 17 and 18, rotation of the drive shaft 2010 in a first direction causes the camera device 180 to pan/tilt to face upwards while rotation of the drive shaft 2010 in a second direction causes the camera device 180 to pan/tilt to face downwards. Signals to control the motor 2008 may be provided via a wire that is routed from the wire cap 640 through the bracket 184 and the motor cover 1907.

Control Circuitry Embodiments

Figure 11:
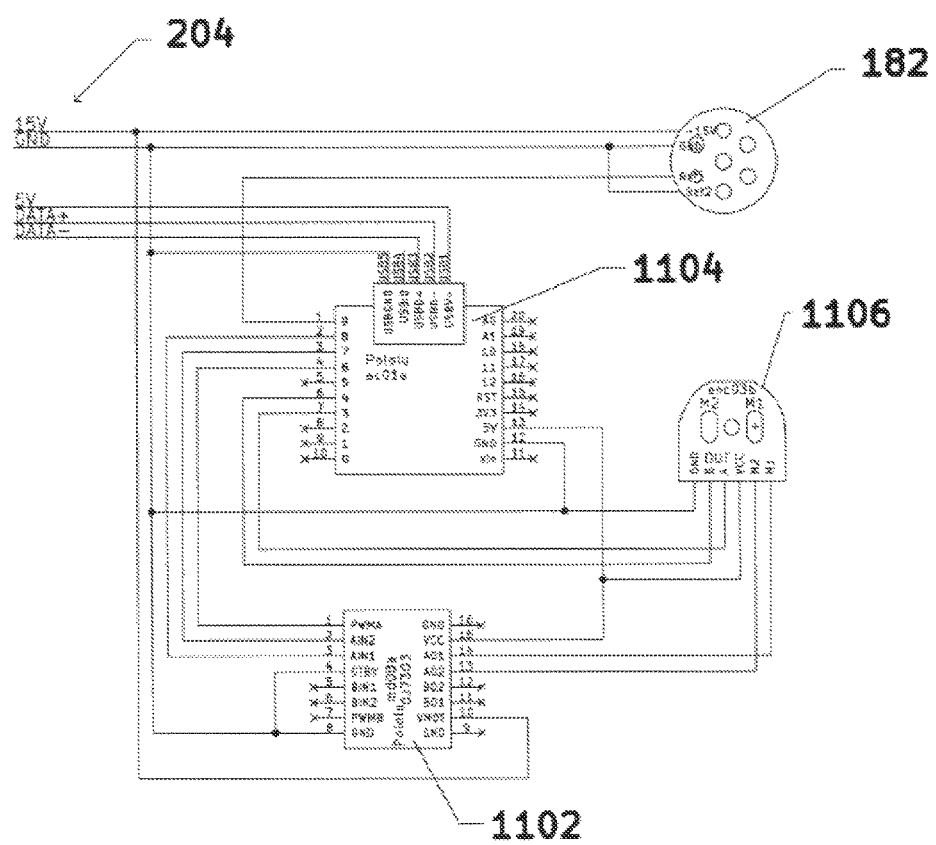
Figure 14:
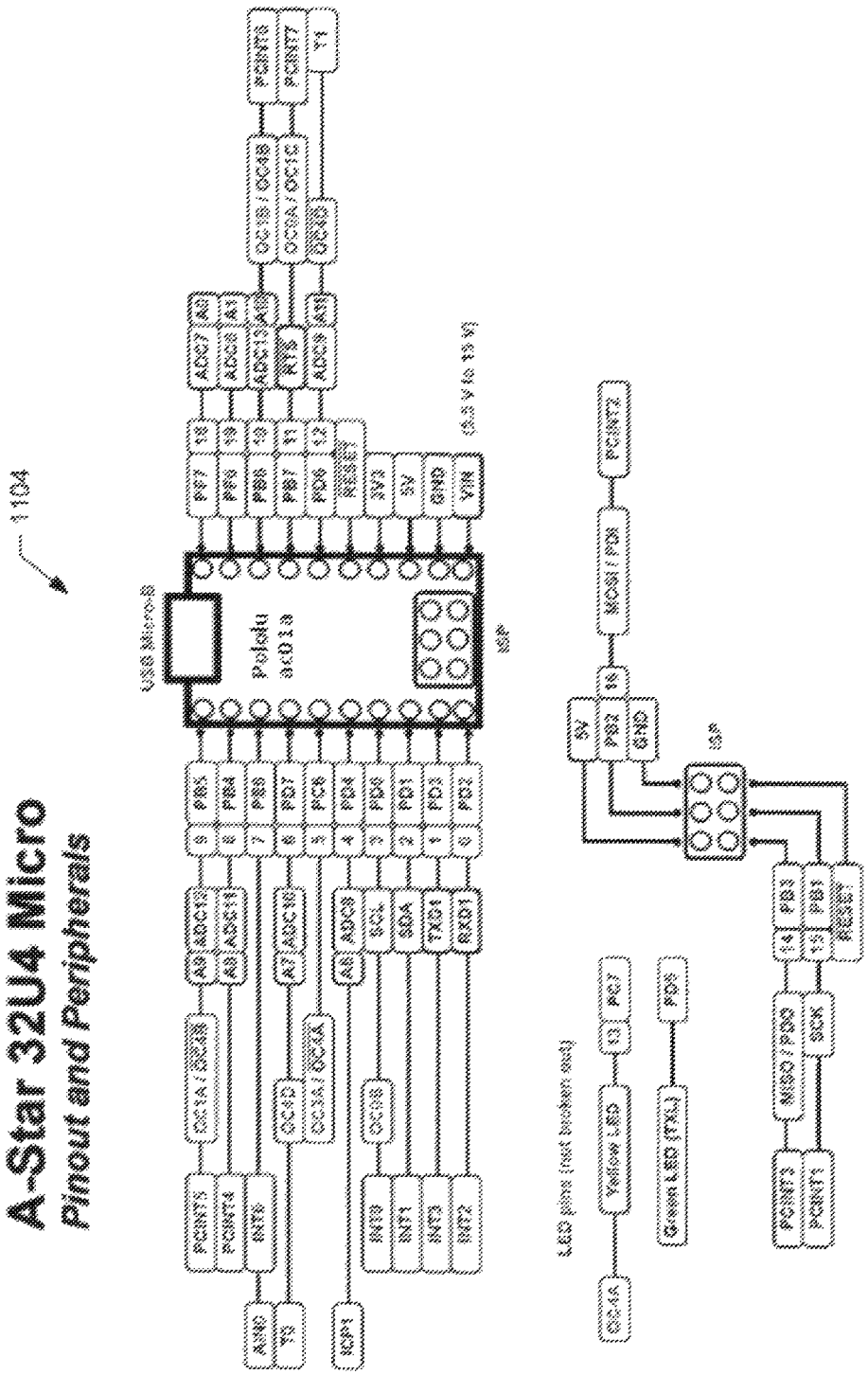

The example rotatable camera apparatus 150 is controlled via one or more onboard control circuitry, which may be communicatively coupled to topside control circuitry. FIG. 11 shows a diagram of circuits 1102, 1104, and 1106 that may be included within the interior section 608 of the connector cup 602 to control the motor 624 and/or the lighting device 182. In the illustrated example, wire 204 includes a first voltage line, a first ground line, and positive/negative data lines. The first voltage line may supply, for example five volts. The wire 204 also includes a second voltage line and a second ground line, which may provide, for example fifteen volts. As shown in FIG. 11, the second ground line and second power line provide power for the lighting device 182 and the motor (via motor control circuit 1102). The first power and ground lines are configured to provide power to circuits 1102, 1104, and 1106. FIG. 14 shows a diagram of the circuit 1104, which includes, for example, an A-star 32U4 microcontroller configured to control the rotatable camera apparatus 150. A separate power and/or control line may be provided for the motor assembly 1902 of FIGS. 19 and 20.

The data lines are configured to provide digital control instructions to the circuit 1104, which converts the instructions to analog voltages operating the motor 624 and/or the lighting device 182. For example, the circuit 1104 may receive lighting and rotating commends. Rotating commands are processed into voltage signals, which are sent to, for example, AIN1 pin of the circuit 1102 to control rotation of the motor 624. Lighting commands are processed into voltage and/or PWM signals, which are sent to, for example, the PWM and AIN2 pins. The PWM signals may provide a frequency at which the lighting device 182 is to operate.

The example circuit 1106 of FIG. 11 is configured to determine a position of the drive shaft 618 of the motor 624 using the reference shaft 630. Specifically, as shown in FIG. 12, a reference magnetic encoder 1202 is connected to an end of the reference shaft 630 adjacent to the circuit 1106. The magnetic encoder 1202 includes at least one magnet. Magnetic detectors on the circuit 1106 detect when the magnet(s) from the encoder 1202 pass in proximity to determine how much the reference shaft 618 has rotated. (For reference, FIG. 13 shows a diagram of the motor assembly 620 without the encoder 1202 and the circuit 1106). The position of the reference shaft 630 is used to determine a position of the drive shaft 618 to provide feedback to circuit 1104 for controlling the motor 624. The circuit 1106 may also determine a position of the drive shaft 2010 of the motor 2008.

Figure 15:
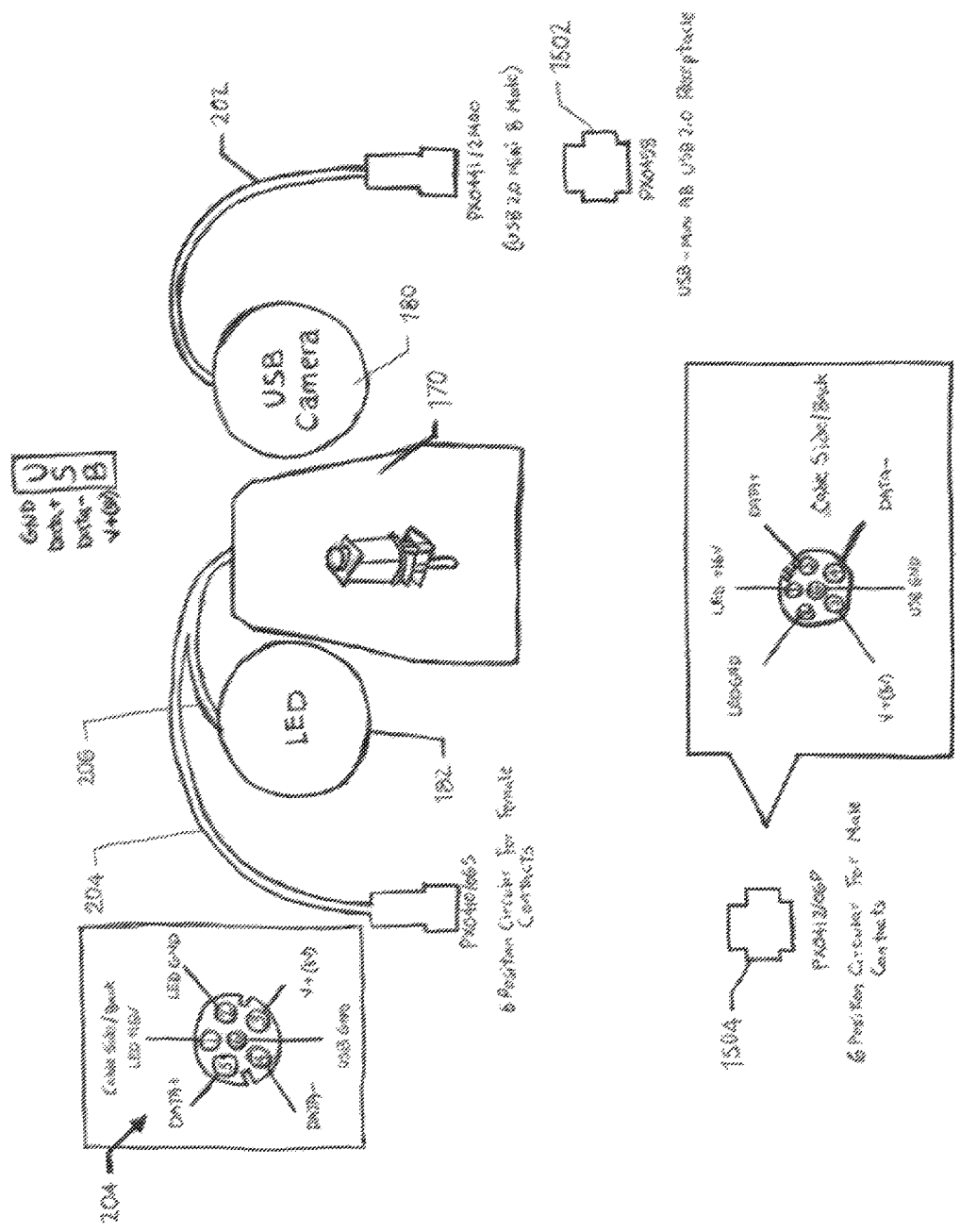

FIG. 15 shows a diagram of power/signal connections between the body 152 of the ROV 100, the camera connection housing 170, the camera device 180, and the lighting device 182. As mentioned above, wire 202 connects the camera device 180 to connector 1502 at the body 152 of the ROV 100. Additionally, wire 204 connects the camera connection housing 170 to connector 1504 at the body 152 of the ROV 100. Further, wire 206 connects the camera connection housing 170 to the lighting device 182. FIG. 16 shows a diagram of the lighting device 182, according to an example embodiment.

Motor Positioning Embodiment

As discussed above, the motor assembly 620 is located in the camera connection housing 170. In other examples, the motor assembly 620 and the magnet plate 612 are located in the anchor housing 160 instead of the camera connection housing 170. In this embodiment, the motor 620 is configured to rotate magnets 506 via the magnet plate 612. In addition, the magnets 610 are immovably connected to the connector cup 602 and/or another magnet plate 612 that is directly connected to the connector cup 602. The magnet coupling between the magnets 506 and 610 causes the magnets 610 to follow the rotational movement of the magnets 506. The direct coupling between the magnets 610 and the cup 602 causes the cup 602 to also rotate, thereby rotating the camera device 180 and/or the lighting device 182 about the z-axis within the x-y plane (as shown in FIG. 1 and FIG. 18). It should be appreciated that the positioning of the motor assembly 620 in the anchor housing 160 reduces the amount of wiring needed for the camera connection housing 170.

Mechanical Connection Embodiment

As discussed above, the camera connection housing 170 is connected to the anchor housing 160 via magnetic attraction between magnets 508 and 610. In some examples, the magnets may be replaced with other components. For example, the anchor housing 160 may include a ball bearing ring that facilitates rotation of the camera connection housing 170. A connection assembly may be provided with the ball bearing ring that enables the camera connection housing 170 to be easily connected removed. The connection assembly may include, for example, a snap connector, a locking-tab connector, and/or screw threads. In this embodiment, the motor assembly 620 may be located in the anchor housing 160 and/or the camera connection housing 170.

Electrical Connection Embodiment

As discussed above, wires 202, 204, and 206 are used to route power and/or data between the ROV 100 and the camera device 180 and/or the lighting device 182. In other examples, the wires 202, 204, and/or 206 may be routed through the anchor housing 160 to the camera connection housing 170 to reduce exposure of the wires in the aquatic environment. In some embodiments, the wires may be replaced with other solutions. For example, a wireless data and/or power connection may be provided between the anchor housing 160 and the camera connection housing 170. Wireless connections may include, for example, NFC, Zigbee®, Bluetooth®, or radio-frequency. In addition, the anchor housing 160 and the camera connection housing 170 may include tuned inductors to facilitate small distance wireless power transmission. In other examples, the anchor housing 160 and the camera connection housing 170 may include one or more concentric conductive rings to facilitate power and/or data transfer. Insulation may exist between the rings to prevent arching or interference. The conductive rings enable the anchor housing 160 to remain in power and/or signal communication camera connection housing 170 regardless of rotation of the camera connection housing 170.

CONCLUSION

It will be appreciated that each of the systems, structures, methods and procedures described herein may be implemented using one or more computer program or component. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. A camera apparatus comprising:
   an anchor housing configured to be connected to a body of a remotely operated vehicle, the anchor housing including:
      a first magnet,
      a base cup including an interior recess section configured to hold the first magnet stationary, and
      a base plate connected to the base cup configured to enclose the first magnet;
   a camera connection housing configured to be rotatably connected to the anchor housing, the camera connection housing including:
      a connector cup including
         a closed end configured to contact the base plate of the anchor housing,
         an open end, and
         an interior section,
      a second magnet located at an interior side of the closed end of the connector cup, the second magnet configured to magnetically couple to the first magnet,
      a magnet plate including
         a magnet end configured to secure the second magnet to the interior side of the closed end of the connector cup, and
         a motor engagement end,
      a motor assembly including
         a motor configured to rotate a drive shaft, the drive shaft connected to the motor engagement end of the magnet plate,
         a motor bracket mechanically coupled to the motor assembly, and
         a coupling cover connected to the open end of the connector cup configured to enclose the interior section of the connector cup, the coupling cover being mechanically connected to the motor bracket; and
   a camera device mechanically coupled to the camera connection housing.

2. The camera apparatus of claim 1, further comprising a wire cap mechanically connected to the coupling cover, the wire cap and coupling cover each including at least one window to enable one or more wires to be routed to the motor.

3. The camera apparatus of claim 1, further comprising a lighting device mechanically coupled to the camera connection housing.

4. The camera apparatus of claim 3, wherein the lighting device is connected to a first side of the camera connection housing and the camera device is connected to a second side of the camera connection housing, the second side being opposite from the first side.

5. The camera apparatus of claim 3, wherein the lighting device is positioned in a stacked arrangement with respect to the camera device.

6. The camera apparatus of claim 1, wherein the magnetic coupling between the first magnet and the second magnet holds the magnetic plate in place causing the motor to rotate around the drive shaft, which causes the connector cup to rotate with respect to the anchor housing and causes the camera device to rotate.

7. The camera apparatus of claim 1, further comprising at least one wire routed between the camera device and the body of the remotely operated vehicle, the wire configured to provide at least one of a power connection and a data connection between the camera device and the remotely operated vehicle.

8. The camera apparatus of claim 1, wherein the camera apparatus is configured to operate underwater or in the air.

9. A remotely operated vehicle apparatus comprising:
   an anchor housing connected to a body of the remotely operated vehicle, the anchor housing including a first magnet and base cup configured to hold the first magnet stationary;
   a camera connection housing configured to be rotatably connected to the anchor housing, the camera connection housing including:
      a connector cup configured to contact the anchor housing,
      a second magnet located inside the connector cup, the second magnet configured to magnetically couple to the first magnet,
      a magnet plate configured to retain the second magnet inside of the connector cup, and
      a motor assembly including a motor configured to rotate a drive shaft, the drive shaft being connected to the magnet plate; and
   a camera device mechanically coupled to the camera connection housing,
   wherein actuation of the motor causes the connector cup to rotate with respect to the anchor housing while being magnetically coupled to the anchor housing.

10. The remotely operated vehicle apparatus of claim 9, wherein the remotely operated vehicle apparatus is configured to operate underwater or in the air.

11. The remotely operated vehicle apparatus of claim 9, further comprising a lighting device mechanically coupled to the camera connection housing.

12. The remotely operated vehicle apparatus of claim 9, further comprising a pan and tilt assembly mechanically connected to the connector cup, the pan and tilt assembly including a pan and tilt motor configured to pan or tilt the camera device upwards and downwards with respect to the remotely operated vehicle apparatus.

13. The remotely operated vehicle apparatus of claim 9, further comprising control circuitry configured to provide power to the motor and determine a position of the drive shaft of the motor.

14. The remotely operated vehicle apparatus of claim 13, further comprising at least one wire connected between the control circuitry and a remote control station to receive at least one of power and control instructions for operating the motor and the camera device.

15. The remotely operated vehicle apparatus of claim 13, wherein the control circuitry is configured to transmit images received from the camera device to a remote control station.

16. The remotely operated vehicle apparatus of claim 13, further comprising:
   a forward compartment located in a forward section of the body;
   glass enclosing the forward compartment; and
   a forward-facing camera located in the forward compartment.

17. The remotely operated vehicle apparatus of claim 9, wherein the anchor housing and the camera connection housing are located on a top side of the body of the remotely operated vehicle apparatus.

18. The remotely operated vehicle apparatus of claim 9, wherein the magnetic coupling between the anchor housing and the camera connection housing provides 360° rotation for the camera device.

* * * * *